Jan. 29, 1952　　　　F. G. WILDE　　　　2,583,678
APPARATUS FOR FEEDING AQUA AMMONIA AND THE LIKE
Filed Aug. 15, 1946
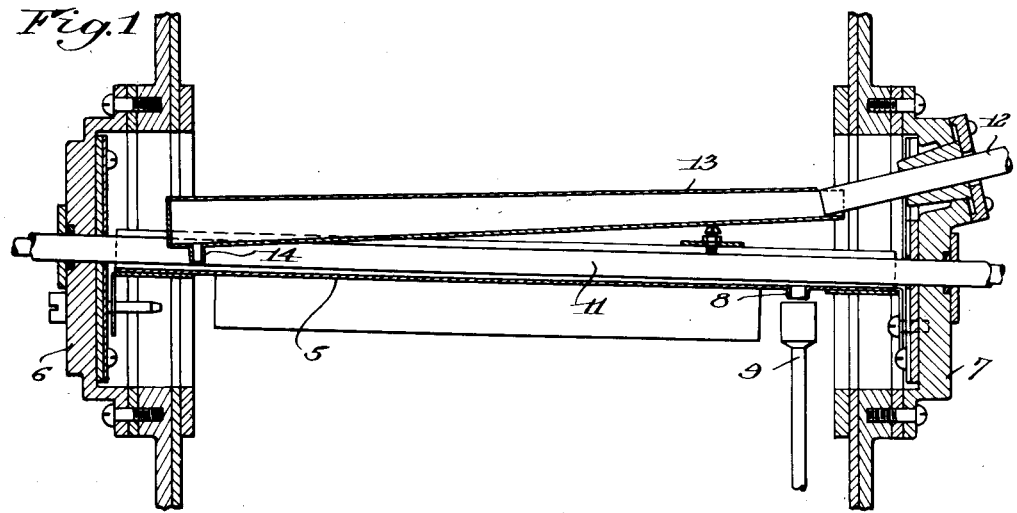
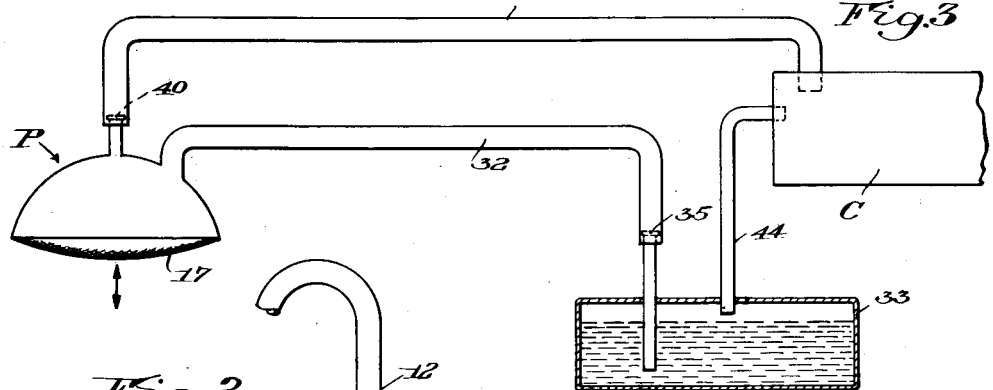
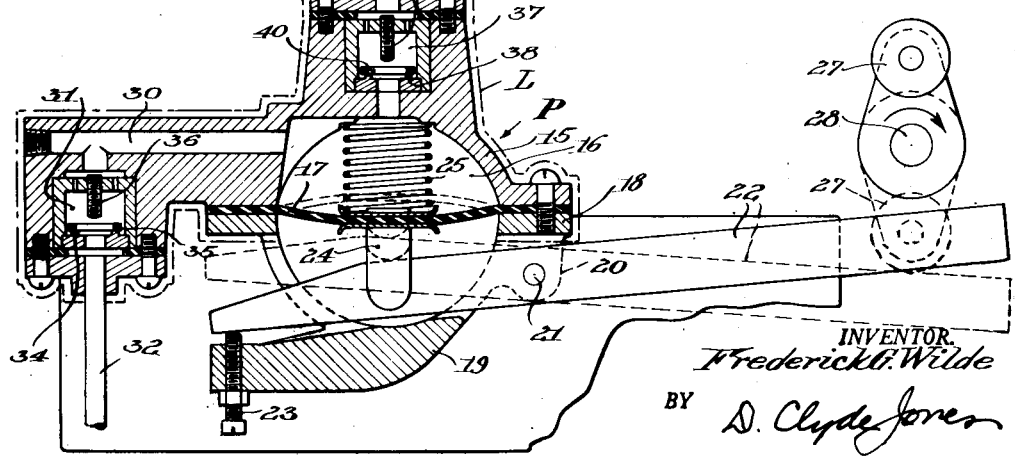
INVENTOR.
Frederick G. Wilde
BY D. Clyde Jones
his Attorney Patented Jan. 29, 1952

2,583,678

UNITED STATES PATENT OFFICE 2,583,678

APPARATUS FOR FEEDING AQUA AMMONIA AND THE LIKE

Frederick G. Wilde, Rochester, N. Y., assignor to Paragon Revolute Corporation, Rochester, N. Y., a corporation of New York Application August 15, 1946, Serial No. 690,821

2 Claims. (Cl. 137—78)

This invention relates to apparatus for feeding aqua ammonia or the like to a photosensitive print developer of the ammonia vapor type.

In developers of this type it is customary to produce ammonia vapor by heating an evaporating tray containing aqua ammonia. This results in evaporation of the liquid thereby providing the mixture of ammonia vapor and water vapor necessary for the proper developing of an exposed print.

In previous developers, the aqua ammonia has been supplied to evaporating trays either from a gravity tank by means of a drip feed or else by a pump discharging through a restricted outlet of the needle valve type whereby the discharged aqua ammonia drips into the tray.

Where a gravity tank is used, the feed is not uniform, but varies as the level of the aqua ammonia in the tank changes, and also varies as the needle valve becomes clogged with sediment, so that frequent feed adjustments by the operator are necessitated. On the other hand, where a pump has been used in prior arrangements for this purpose, the feeding of the aqua ammonia of the desired concentration to the tray, has also been erratic. This is due to the fact that the necessarily small quantity of liquid delivered to the needle valve of the drip feed at each stroke of the pump, has proved to be inadequate to purge ammonia vapor from the pump chamber. Consequently this vapor gradually accumulated in the chamber until the pump completely stopped discharging aqua ammonia. It will be understood that with this accumulated vapor in the chamber sufficient vacuum would not be developed in the chamber to draw the liquid therein but instead the pump would alternately expand and contract the accumulated vapor without advancing any liquid therethrough. In order to obviate this difficulty in the use of pumps for this purpose, it has been necessary to effect a fifty per cent dilution of aqua ammonia which preferably should have a concentration of 26 degrees Baumé. Such dilution requires excessive evaporation due to the diluting water.

In accordance with the present invention there is provided a novel method and novel apparatus whereby aqua ammonia at normal concentration of at least 26 degrees Baumé, can be pumped to the evaporating tray at an accurately uniform rate so that frequent feed adjustments are no longer necessary.

The various features and advantages of the invention will appear from the detailed description and claims when taken with the drawings in which:

Fig. 1 when combined with Fig. 2 disclose one form of apparatus for practicing the method of this invention, Fig. 1 illustrating a vertical section through the evaporating tray and related aqua ammonia delivering conduits, while Fig. 2 is a vertical section through the pump which delivers the aqua ammonia to the conduits and thence to the mentioned evaporating tray;

Fig. 3 is a diagrammatic showing of this apparatus useful in explaining the invention.

In the copending application of Sullivan et al., Serial No. 607,830, filed July 30, 1945, now Patent No. 2,475,809, July 12, 1949, there is disclosed a photosensitive print developer of the ammonia type. In this developer, a photosensitive print is advanced past an opening in a chamber containing ammonia vapor and water vapor which vapors develop successive portions of the print as it is advanced past the opening. The vapors are generated within the chamber of that device, by means of a heated evaporating tray to which aqua ammonia is supplied by suitable feeding means.

The present invention is directed to a novel apparatus for slowly feeding a high vapor pressure liquid for whatever purpose but specifically for feeding aqua ammonia to the evaporating tray of a photoprint developer, it being understood that the present arrangement can be incorporated in the developing device shown in the mentioned application or in any similar device.

According to the invention, aqua ammonia or like liquid is pumped in such large spurts that the pump will continue to be purged of ammonia vapor. The large spurts are caused to flow sluggishly until they combine into a slow-moving stream which is discharged in the form of drops, into a device, such as an evaporating tray of an ammonia vapor type of photoprint developer.

Apparatus suitable for carrying out the invention is illustrated in Figs. 1 and 2. Referring first to Fig. 1, the numeral 5 designates an evaporating tray which is supported on the end plates 6 and 7 in a position slightly inclined to the horizontal so that the liquid ammonia will flow slowly from left to right (Fig. 1) along the tray to a discharge outlet 8, opening into a pipe 9, so that any excess liquid in the tray can drain away. A heating unit 11 which may be of the electric type is mounted in slightly spaced relation to the bottom of the tray, the unit extending through the supporting plates 6 and 7. The aqua ammonia is supplied to the evaporating tray 5 by means of a pump, generally designated P (Fig. 2), the pump intermittently discharging spurts of the aqua ammonia into its outlet pipe 12. The spurts of aqua ammonia from pipe 12 are delivered into a conduit 13 which is slightly inclined downward from right to left (Fig. 1) namely from the outlet of the pipe 12 to the high end of the tray 5. The conduit 13 serves to combine the spurts of aqua ammonia into a sluggishly flowing stream which is eventually delivered in the form of drops at the low end 14 of the conduit. It will be noted that the conduit 13 is adjacent the heating unit 11 so that the sluggishly flowing aqua ammonia in the conduit 13, will be somewhat heated before it is delivered into the evaporating tray.

A preferred form of pump suitable for use in practicing this invention, is illustrated in Fig. 2. This pump comprises a pump body 15 shaped to provide a hemispherical chamber 16. The bottom of this chamber is closed by a flexible diaphragm 17 having its margin suitably clamped to the body by an annular clamping member 18 secured thereto. This clamping member also includes a bracket 19 provided with apertured spaced ears 20 to receive the pivot pin 21 on which the actuating arm 22 can rock between the limiting positions indicated in full and dotted lines. The free end of bracket 19 is also provided with an adjustable set screw 23 which limits the downward movement of the left end of the arm 22 and thereby serves as an adjustment for determining the length of the stroke of the pump. The left end of the arm 22 engages a lug 24 suitably clamped at the center of the diaphragm 17. A coil spring 25 extending between the chamber and the upper surface of the diaphragm normally forces the diaphragm 17 and, therefore, the left end of the arm 22 to a position shown in full lines in Fig. 2. The actuating arm 22 is rocked about pivot 21 by a suitable crank 27 which in turn is rotated by a driven shaft 28. It will be understood that the crank 27, as it rotates, intermittently forces the right end of the arm 22 downward against the action of spring 25 which normally tends to restore the right-hand end of the arm 22 to its upper position.

The body of the pump is made with an inlet passage 30 communicating with pump chamber and with an intake valve chamber 31. This chamber communicates through a pipe 32 with a closed supply tank 33 (Fig. 3) of aqua ammonia which is located below the level of the pump. The bottom of the valve chamber 31 is provided with an apertured valve seat 34 on which there normally rests a valve disc 35. This disc which is preferably made of a plastic or other suitable non-wetting material may be of any convenient outline to engage the entire annular surface of the valve seat and yet permit liquid to pass around it when it is in its raised position. The set screw 36 limits the upward travel of disc 35 and insures that it will always remain in its horizontal position. The body of the pump 15 is also provided with an outlet valve chamber 37 communicating with the top part of the chamber and with outlet pipe 12. The bottom of the valve chamber 37 is provided with an apertured member with an annular valve seat 38 on which there normally rests a valve disc 40 also made of plastic or other non-wetting material. The screw 41 limits the upward movement of the disc 40, thereby insuring that it will always be maintained in its horizontal position. Both valve seats are preferably made of stainless steel. The outlet valve chamber opens into the outlet pipe 12, which discharges the aqua ammonia in spurts into conduit 13 (Fig. 1). It is preferred to enclose the pump with suitable lagging L.

The operation of the pump is, briefly, as follows, as the driven shaft 28 rotates, the crank 27 mounted thereon, periodically rocks the right end of the actuating arm 22 downward about the pivot pin 21 causing the left end of this arm to rise. As this end of the arm rises, it engages lug 24 to elevate the diaphragm 17 to its dotted line position (Fig. 2) against the action of spring 25. As the diaphragm rises, it forces a volume V of aqua ammonia past the outlet valve disc 40 into the pipe 12. During this part of the cycle the inlet valve disc 35 snugly engages the valve seat 34 to prevent any of the aqua ammonia from returning through pipe 32 to the tank 33. After the completion of the upward stroke of the left end of the actuating arm 22, the spring 25 forces the diaphragm 17 and the left end of arm 22 downward until this end of the arm engages stop 23. The diaphragm, as it is being lowered, tends to create a vacuum in the pump chamber, so that a volume V of aqua ammonia is drawn into the chamber through the inlet. Since the storage tank 33 is below the level of the pump, there is no head of liquid in pipe 32 normally tending to unseat valve disc 35. Also a pipe 44 communicating with the tank 33 and with the evaporating chamber C, equalizes the pressures in both spaces so that the valve disc 35 will not be unseated by abnormal pressure conditions.

In accordance with the present invention the pump is operated to deliver spurts of a minimum of ¾ of a cubic centimeter of aqua ammonia preferably at a temperature of less than 95° F. The spurts of aqua ammonia are delivered through outlet pipe 12 into the conduit 13 where they combine to form a sluggishly flowing stream which is subjected to the heat present within the chamber. The aqua ammonia, thus partially heated, is delivered in the form of drops to the evaporating tray 5, thereby obviating any splashing.

What I claim is:

1. Apparatus for delivering to the tray of an evaporating unit, a liquid having a higher vapor pressure than the atmosphere, comprising an intermittently operating pump for delivering uniform spurts of the liquid upward, and a downwardly sloping conduit for receiving said spurts of liquid and for causing them to flow sluggishly until they form a stream, said conduit being provided with means for slowly discharging the stream into said tray.

2. Apparatus for delivering to the tray of an evaporating unit, a liquid having a higher vapor pressure than the atmosphere, comprising an intermittently operating pump for delivering uniform spurts of the liquid upward through a substantially unrestricted outlet, means for substantially insulating said pump from ambient temperatures, a downwardly inclined conduit into which the spurts are delivered and flow sluggishly until they form a stream, and means for warming said liquid as it flows along the conduit, the lower end of the conduit being provided with means for slowly discharging the stream into said tray.

FREDERICK G. WILDE.

REFERENCES CITED

The following references are of record in the file of this patent:

UNITED STATES PATENTS

| Number | Name | Date |
|---|---|---|
| 857,563 | Leopold | June 18, 1907 |
| 2,096,015 | Von Meister | Oct. 19, 1937 |
| 2,287,396 | Roth | June 23, 1942 |
| 2,384,155 | Brunk | Sept. 4, 1945 |